INVENTORS
ROBERT W. ASTHEIMER
ERIC M. WORMSER
BY
Blair & Spencer
ATTORNEYS

July 14, 1959 R. W. ASTHEIMER ET AL 2,895,049

IMAGE TRANSDUCER

Filed June 26, 1957 6 Sheets-Sheet 2

INVENTORS
ROBERT W. ASTHEIMER
ERIC M. WORMSER
BY
Blair & Spencer
ATTORNEYS

July 14, 1959 R. W. ASTHEIMER ET AL 2,895,049

IMAGE TRANSDUCER

Filed June 26, 1957 6 Sheets-Sheet 3

INVENTORS
ROBERT W. ASTHEIMER
ERIC M. WORMSER

BY Blair & Spencer

ATTORNEYS

July 14, 1959 R. W. ASTHEIMER ET AL 2,895,049

IMAGE TRANSDUCER

Filed June 26, 1957 6 Sheets-Sheet 4

INVENTORS
ROBERT W. ASTHEIMER
ERIC M. WORMSER

BY Blair & Spencer

ATTORNEYS

IMAGE TRANSDUCER

Filed June 26, 1957 6 Sheets-Sheet 5

INVENTORS
ROBERT W. ASTHEIMER
ERIC M. WORMSER
BY Blair & Spencer
ATTORNEYS

July 14, 1959 R. W. ASTHEIMER ET AL 2,895,049

IMAGE TRANSDUCER

Filed June 26, 1957 6 Sheets-Sheet 6

INVENTORS
ROBERT W. ASTHEIMER
ERIC M. WORMSER
BY Blair and Spencer
ATTORNEYS 2,895,049

IMAGE TRANSDUCER

Robert W. Astheimer, Springdale, and Eric M. Wormser, Stamford, Conn., assignors to Barnes Engineering Company, Stamford, Conn.

Application June 26, 1957, Serial No. 668,107

11 Claims. (Cl. 250—65)

This invention relates to an image transducer capable of converting an image in one form of radiation into a second image in another form of radiation. More particularly it relates to an infra-red camera sensitive to long-wave infra-red energy and capable of producing a "heat picture" in which the grayness of the picture is proportional to the infra-red radiance of the objects in the field of view. The infra-red radiance is a well known function of the emissivity and temperature of these objects.

It is often desirable to obtain a "heat picture" of an object, to determine the efficiency of insulation of a house or factory e.g. to ascertain the heat loss through smoke stacks, to locate "hot spots" in industrial apparatus operating at high temperatures or which must be controlled within temperature limits. In such a picture warm objects are represented by light colored areas and cooler objects by darker areas or vice versa. Such "heat pictures" are also useful in the analysis of welds, in determining heat distribution in chemical processing equipment and aircraft engines. They are particularly useful in photographing objects obscured by darkness, haze or smoke. Film sensitive to infra-red radiation is available for taking pictures of objects by reflected infra-red radiation but is sensitive to wave lengths shorter than one micron only. Objects at ambient temperature emit radiation predominantly in the 5 to 15 micron wavelength range. Therefore, scenes which are to be pictured on infra-red sensitive film must be illuminated by an infra-red source. Consequently he grayness of the recorded picture is proportional not to the temperature of the objects pictured but rather to the near infra-red reflectivity of these objects.

To provide means for obtaining "heat pictures," sensitive fast infra-red detectors have been developed which instantaneously view only a small portion of the field to be covered. These detectors are made to scan, either optically or mechanically, the entire field of view, and the output signals therefrom are used to modulate light beams which sweep over photographic plates or films in synchronism with the scanning movement. The pictures thus recorded are infra-red images or "heat pictures" of the field of view. Cameras of this type, often called scanning radiometers, generally include an optical system which focuses the infra-red radiation from a small area in the field of view on an infra-red detector such as a thermistor bolometer. The output of the detector is then used to modulate the intensity of a light beam as described above or it may modulate the intensity of an electron beam sweeping the face of a cathode ray tube.

For the detector to scan the entire field of view, the optical system must cause radiation from succeeding points in the field to be focused on the detector. This may be done by scanning along a horizontal line in the field and then indexing to scan another horizontal line adjacent the first line, etc. Prior to our invention this was accomplished by rotatably reciprocating and indexing the entire optical head of the camera, i.e., the optical system, the detector, and sometimes portions of the electrical and the display systems. Consequently the scanning operation required a relatively powerful mechanical driving system, resulting in an unduly complex and cumbersome camera. Slow scanning speeds were inherent in these cameras, both because of the difficulty in reciprocating such a large mass at high speeds and because of the effect on the delicate optical system of the shock encountered in starting and stopping rotation at the ends of each scanned line. Further problems were encountered in synchronising the display with the scanning of the field of view. Where the display system was included in the optical head, thus increasing the mass to be reciprocated and indexed and reducing the scanning speed, complex mechanical linkages were used to provide the necessary synchronization; and where the display was divorced from the optical head complex electrical apparatus was required.

These problems, while described with reference to apparatus for converting an infra-red image into a visible light image may in some of their aspects appear in other image transduction systems. For example, it might be desirable to convert an ultra-violet picture or a high frequency radio image to a visible picture. In such case some of the same problems must be solved, and while the apparatus described below is specifically designed for infra-red-to visible light transduction, its adaptation to other radiation is possible.

Accordingly, it is an object of this invention to provide an image transducer capable of converting an image in one form of radiation into a similar image in another form of radiation. It is another object of this invention to provide an improved radiation-sensitive device such as an infra-red camera capable of obtaining pictures in the far infra-red region, using passively emitted radiation and therefore not requiring a source of illumination. It is a further object of this invention to provide a camera of the above character having a convenient and compact optical system. It is another object of this invention to provide a camera of the above character capable of relatively high speed operation. A further object of this invention is to provide a camera of the above character which is relatively small in size. Another object of this invention is to provide a camera of the above character which provides accurate reproduction of the shape and relative size of an object being observed. It is another object of this invention to provide a camera of the above character which is simple and rugged yet flexible in operation. Other objects of the invention will in part be obvious and in part apparent hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figures 4, 5, 6:
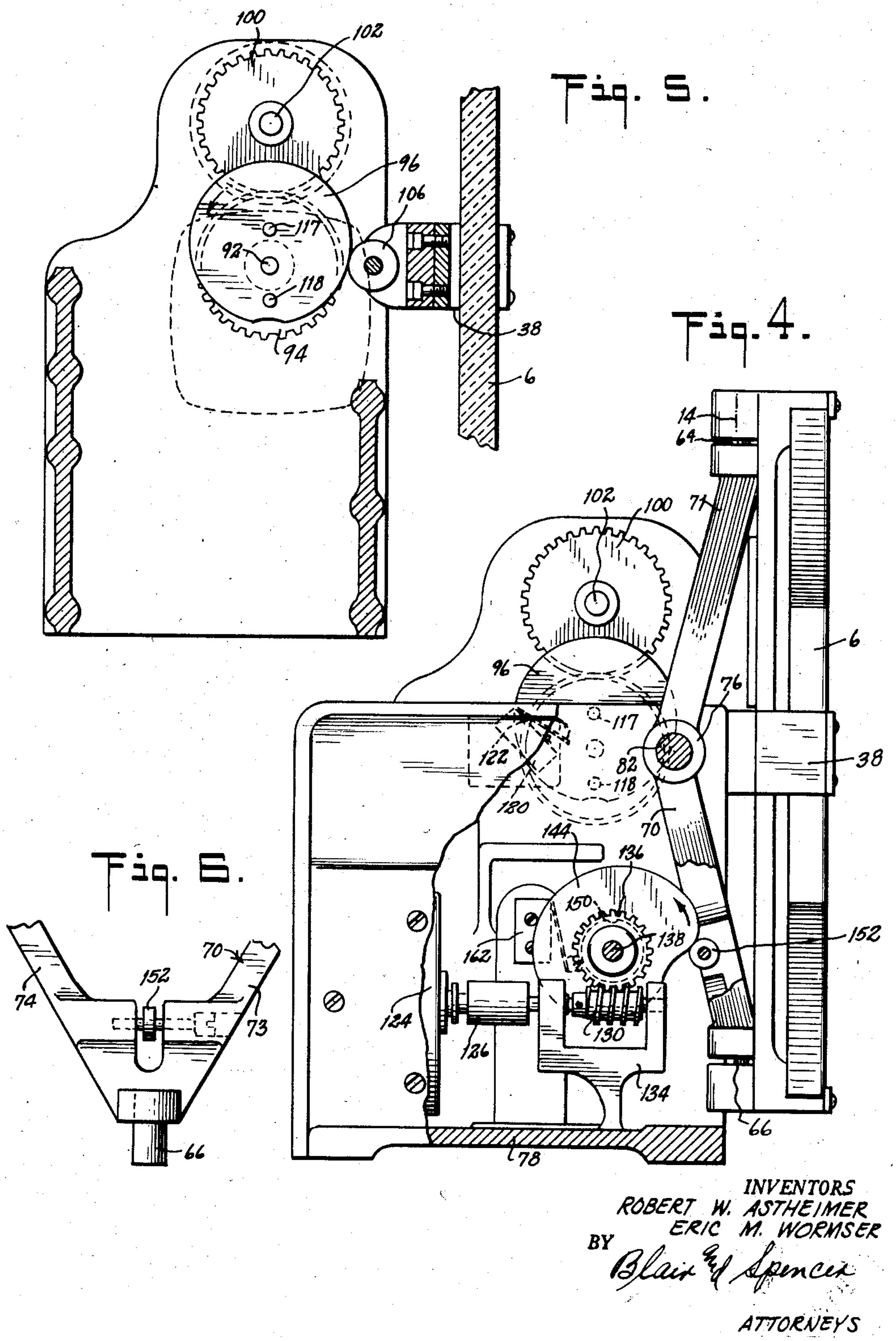
Figure 4 is a side elevation, partially broken away and partially in section, of the scanning mechanism.
Figure 5 is a vertical sectional view taken along line 5—5 of Figure 3.
Figure 7:
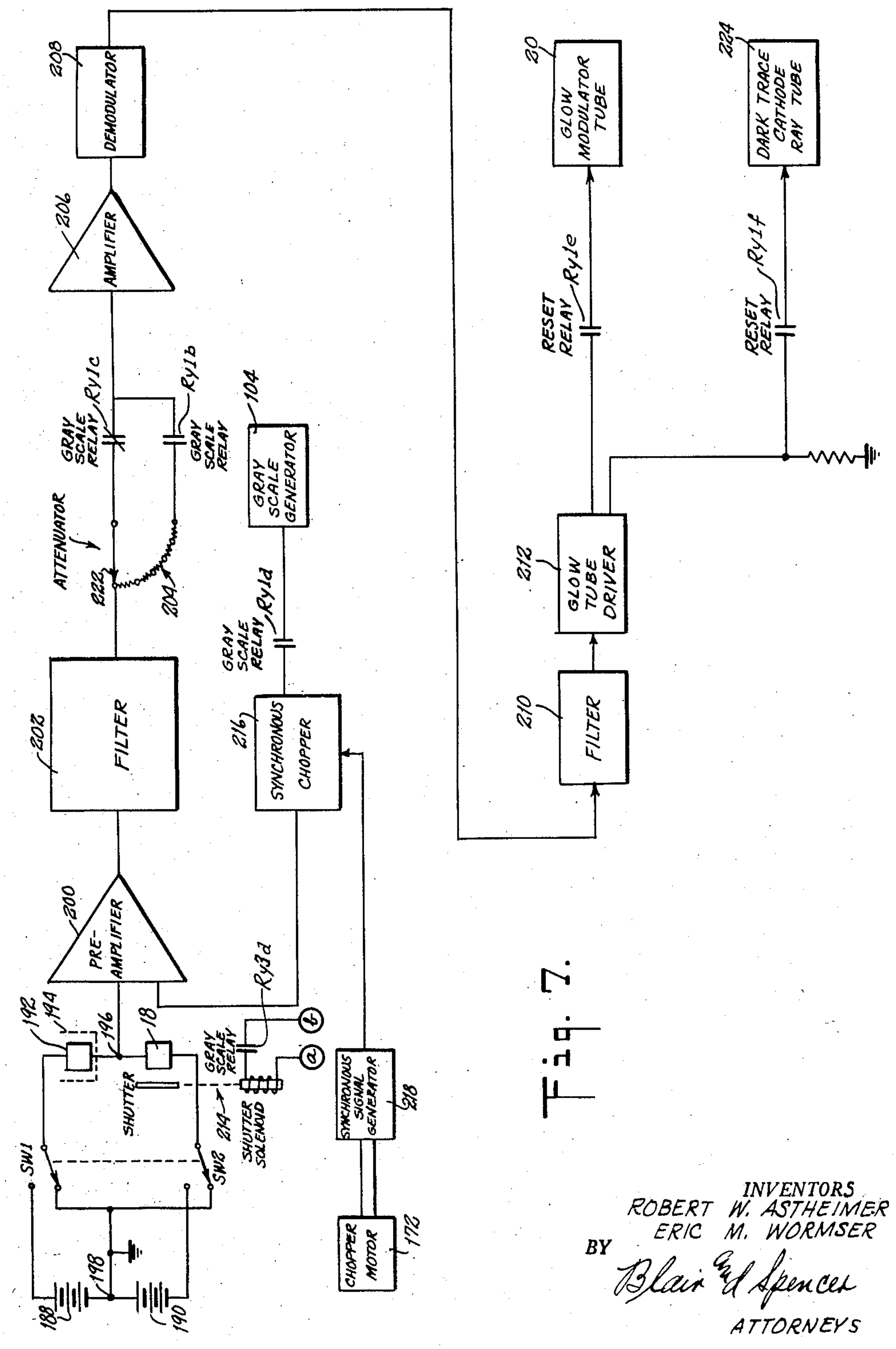
Figure 8:
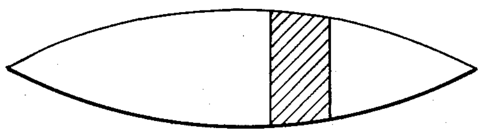
Figure 9:
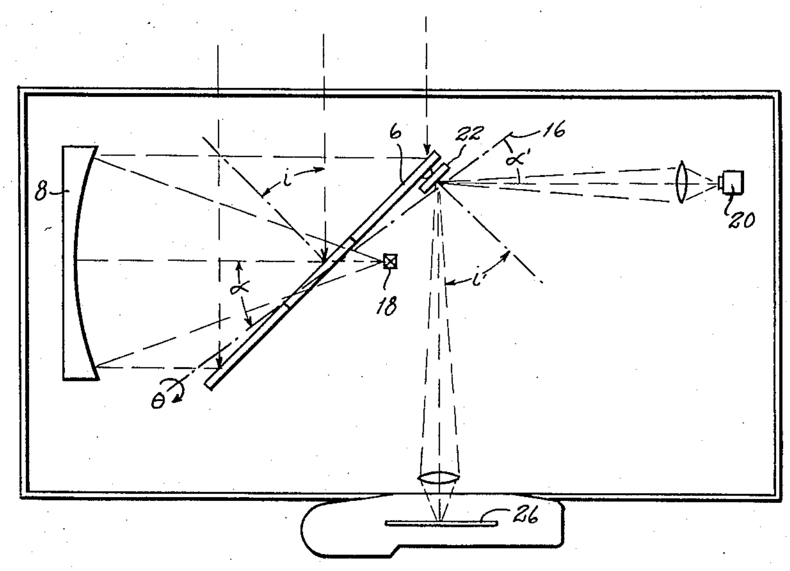

Figure 6 is a fragmentary elevation showing the mounting of the cam follower used to tilt the scanning mirror about the horizontal axis, Figure 7 is a block diagram of the electrical apparatus which may be used in conjunction with the infra-red detector and the glow modulator tube, Figure 8 is a diagram illustrating the shape of the field of view scanned by the camera, and Figure 9 is a diagrammatic sketch of a modified arrangement of scanning mirror, detector, light source and camera which results in a geometrically accurate reproduction of the scanned field.

Similar reference characters refer to similar parts throughout the several views of the drawings.

Figure 1:
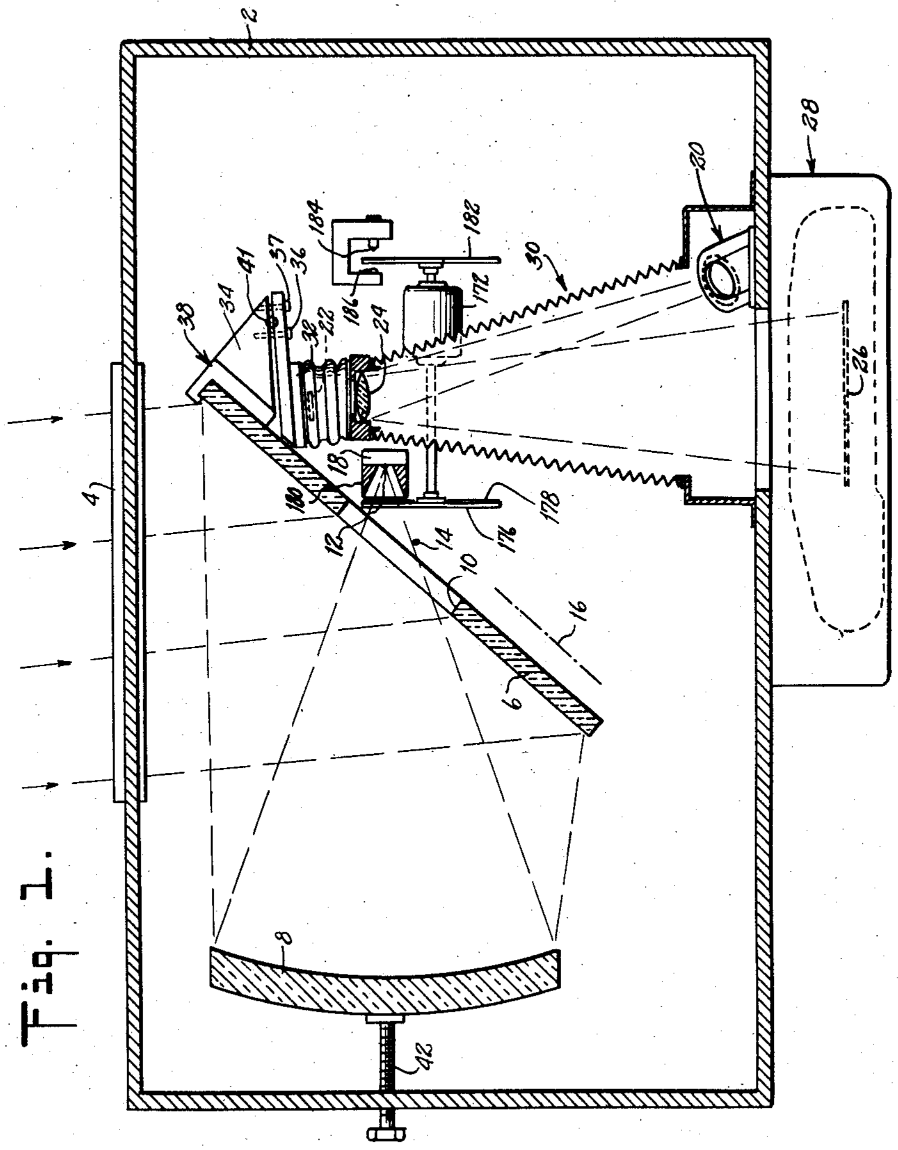
Figure 1 is a schematic horizontal sectional view of our camera, illustrating one arrangement of the component parts.

The general principles of construction and operation of our camera may best be understood by reference to Figure 1, in which the camera is shown enclosed in a housing 2 having therein an infra-red transparent window 4 of silver chloride or other suitable material which transmits the incoming infra-red radiation to a planar scanning mirror 6. Mirror 6 in turn reflects the radiation to a parabolic mirror 8. Such rays striking mirror 8 which are parallel to the axis thereof are reflected through an opening 10 in mirror 6 to converge at a focal point 12. Infra-red radiation from any small point in the field being scanned will cause substantially parallel rays to pass through window 4 to mirror 6. However, only one set of these parallel rays, i.e., the rays from one point, are also parallel to the axis of parabolic mirror 8 thereby to converge at point 12. Thus infra-red radiation from only one small point in the field of view will converge at focal point 12.

Scanning mirror 6 is mounted to oscillate about an axis diagrammatically indicated at 14 by suitable driving mechanism to be described, and as it does so rays from successive points along a substantially horizontal line of the field being scanned converge at focal point 12. After mirror 6 scans one line of the field, it is indexed about a horizontal axis diagrammatically indicated at 16, by mechanical indexing means to be described to scan another line substantially parallel to the previously scanned line. Thus, by this combination of oscillatory and indexing movements mirror 6 causes infra-red rays from each small point in the field end of view to be successively converged at focal point 12.

Preferably an infra-red sensitive detector 18, which may be of the thermistor bolometer type, is disposed to intercept the rays converging at focal point 12. This detector generates an electrical signal whose voltage is proportional to the intensity of the infra-red radiation falling thereon. Thus, in consequence of the scanning operation of mirror 6 the voltage at the output of the detector is a measure of the temperature of the successive points being scanned.

Still referring to Figure 1, our camera has a display system comprising a glow modulator tube generally indicated at 20 emitting a beam of light whose intensity is proportional to the electrical input of the tube, and a plane reproducing mirror 22. A lens 24 converges the light from tube 20 reflected by mirror 22, on a photographic plate or film 26 contained in a camera generally indicated at 28. A bellows arrangement generally indicated at 30 prevents the admittance of extraneous light to plate 26.

Mirror 22 is suitably retained in a mounting 32 desirably secured to scanning mirror 6 by way of brackets 34 and 38 and adjusting bolts 36 and 37. Thus, reproducing mirror 22, being affixed to scanning mirror 6, describes its movements. When mirror 6 oscillates to scan a substantially horizontal line in the field of view, mirror 22 correspondingly oscillates to sweep the beam of light from glow modulator tube 20 over photographic plate 26; likewise when, after scanning the line, mirror 6 vertically indexes for a line adjacent the first line, mirror 22 also indexes vertically to sweep the light beam in a path adjacent the first line on plate 26. Thus for every point in the field of view scanned by mirror 6 there is a similarly located corresponding point on plate 26 swept by the light beam from glow modulator tube 20. And since, as pointed out above, the intensity of the light from the glow modulator tube is proportional to the temperature at the point being examined by detector 18, and the color intensity, i.e., "grayness" of the various parts of the picture produced on plate 26 is proportional to the intensity of the beam, there is reproduced on plate 26 an infra-red replica of the field of view; thus objects are distinguished by temperature differences showing up as gradations of gray on the plate.

It will be seen that since the only parts required to be moved during the scanning operation are the scanning mirror 6 and the relatively small reproducing mirror 22, the inertia of the oscillating mass is small; thus the scanning operation may be accomplished by a relatively simple scanning mechanism, with a minimum of shock to the various components of the unit. Consequently, relatively high scanning speeds are readily obtainable. Moreover, since the reproducing mirror is affixed to the scanning mirror, there is provided a simple, durable, foolproof method of synchronising the formation of the image on plate 26 with the scanning of the field of view. For every rotational movement of one mirror, there is a corresponding movement of the other.

As will be pointed out hereinafter, it may often be desirable to adjust the orientation of reproducing mirror 22 with respect to scanning mirror 6, and to accomplish this bolts 36 and 37 may be utilized in the following manner. Still referring to Figure 1, it may be seen that mounting 32 is spaced apart from bracket 34 by a cylindrical bar 41 or the like, bolts 36 and 37 fastening mounting 32 against the bar. If it is desired to rotate mirror 22 counter-clockwise (Figure 1) with respect to mirror 6, bolt 36 is withdrawn and bolt 37 is turned inwardly, with mounting 32 and mirror 22 thereon pivoting around bar 40 until the desired orientation is attained. If it is desired to rotate mirror 22 clockwise the reverse procedure is applied, i.e. bolt 37 is withdrawn and bolt 36 is turned inwardly.

It may also be desirable to adjust the position of parabolic mirror 8 to insure the location of focal point 12 on the surface of detector 18, and to accomplish this we have provided an adjusting screw generally indicated at 42 threaded through housing 2 and pivotally connected to mirror 8. Thus by turning screw 42 in one direction the parabolic mirror and focal point 12 may be moved to the right (Figure 1), and by turning the screw in the opposite direction the mirror in the focal point may be moved to the left.

From the foregoing it will be seen that the mechanism provided to make scanning mirror 6 scan the field of view should provide a firm mounting for the mirror to eliminate aberrations due to the mirror's describing any movements other than the desired rotational indexing and oscillations. Thus we have provided a scanning mechanism which is simple in construction and operation and yet which provides a rugged base for the scanning and reproducing mirrors.

Figure 2:
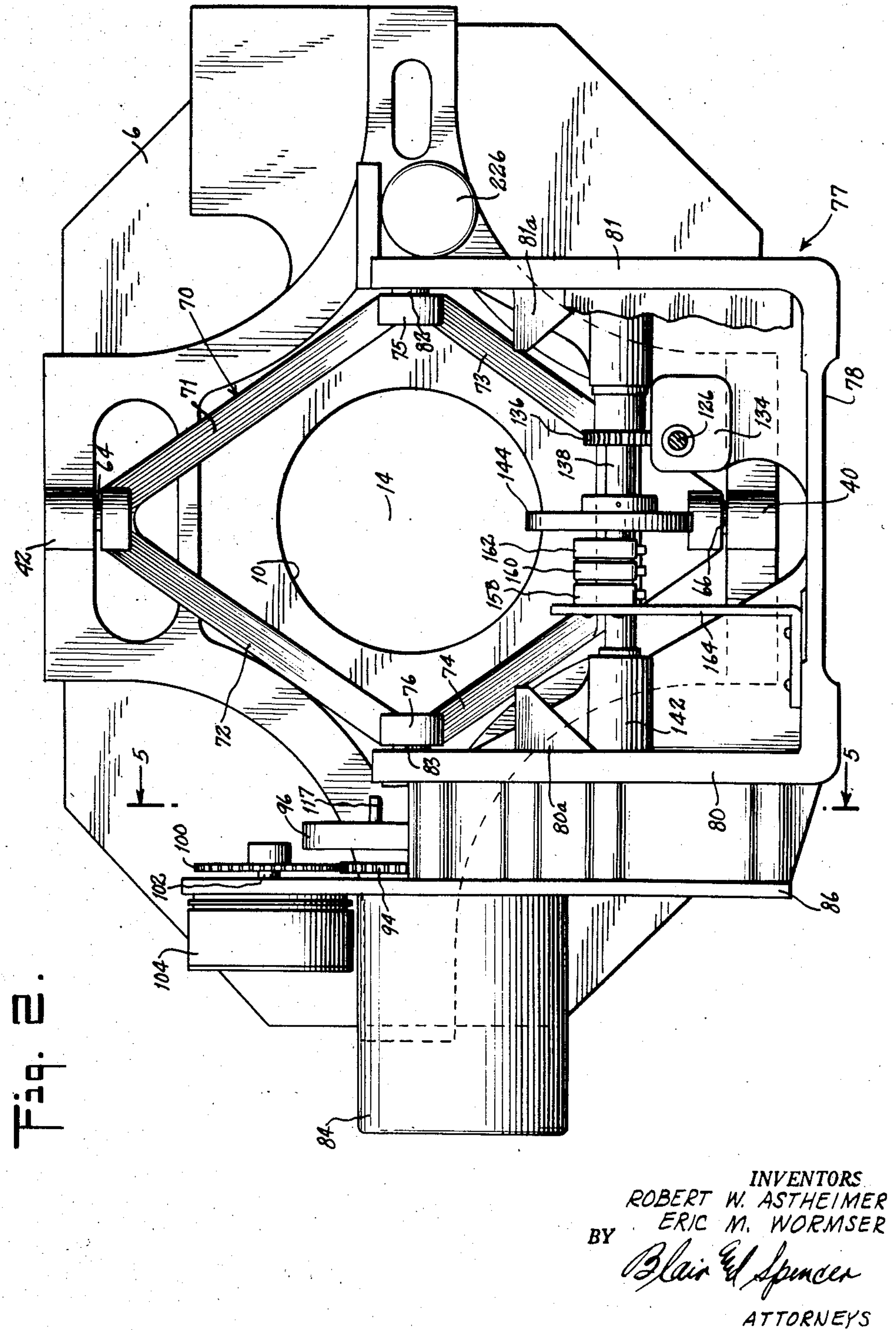
Figure 2 is a rear elevation, partially broken away and partially in section, of the scanning mechanism.
Figure 3:
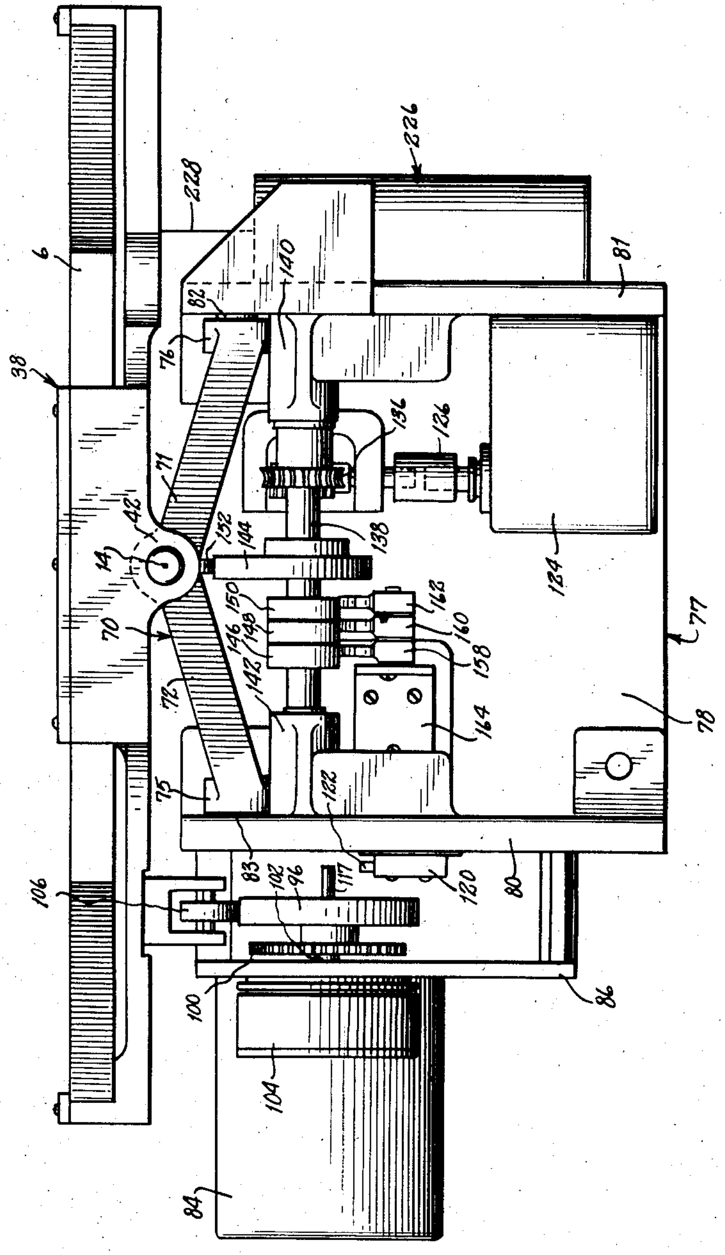
Figure 3 is a top plan view of the scanning mechanism.

As seen in Figures 2 and 3 mirror 6 is suitably fitted in frame 38. Bearings 40 and 42 are formed in the frame to accommodate pivot pins 64 and 66 disposed at the top and bottom of a bracket generally indicated at 70 (Figures 2, 3 and 4) for oscillation of bracket 38 and mirror 6 about axis 14; axis 14 is represented by dot dash lines in Figure 2. This axis 14 is always at right angles to the base of the machine in the geometry of Figure 2 but swings to various angles about the horizontal axis of bearings 75 and 76. Bracket 70 includes arms 71, 72, 73 and 74 which extend rearwardly and terminate in horizontal bearings 75 and 76. As best seen in Figures 2 and 3, a casing generally indicated at 77 includes a base 78 and vertical side walls 80 and 81, with pivot pins 82 and 83 extending therefrom into bearings 75 and 76. Thus scanning mirror 6 carried in frame 38 may be oscillated about axis 14 (bearings 40 and 42) and about a horizontal axis (bearings 75 and 76) 80 and 81 suitable bracket portions 80*a* and 81*a* extend inwardly from side walls (Figure 2) upon which is mounted suitable supporting equipment (not shown) for the detector 18 which is so located with respect to opening 10 as to achieve the operative results previously described with reference to Figure 1.

Referring to Figures 2 and 3, an electric motor 84 is mounted on a plate 86 spaced from and secured to wall 80. The shaft 92 (Figure 5) of motor 84 extends through plate 86 and has keyed thereon a pinion 94 and a cam wheel 96. Pinion 94 meshes with a pinion 100 on shaft 102 of a gray scale generator generally indicated at 104 (Figure 2). Cam wheel 96 (Figure 5) is resiliently urged against a cam follower wheel 106 which is rotatably connected to frame 38, so that operation of motor 84 will cause the scanning mirror 6 to oscillate about axis 14 (bearings 40 and 42, Figure 2). Turning to Figure 5, the cam wheel 96 is eccentrically mounted on shaft 92 and thus oscillates mirror 6 about the axis 14. The cam wheel is so shaped and positioned that these oscillators will cause the detector 18 to scan or traverse the field of view substantially horizontally from one side to the other. After scanning each horizontal line, the mirror is made to index vertically in a manner to be presently described.

As best seen in Figure 5, cam wheel 96 carries two actuator pins 117 and 118 in the path of an indexing switch 120 (Figure 3) suitably mounted on wall 80 and having an arm 122. The switch and pins are so positioned that when scanning mirror 6 is in either extreme position about axis 14, the switch will be closed. This will transmit an electrical impulse to an indexing motor generally indicated at 124 to index the scanning mirror vertically in a manner to be described presently. Thus each time scanning mirror 6 reaches the end of a line in the field of view, it is indexed to scan a new line adjacent and substantially parallel to that previously scanned.

More specifically indexing motor 124 may take the form of a conventional impulse operated rotary stepping switch having a wiper contact mounted on a shaft and adapted to engage successive circumferentially spaced stationary contacts. The wiper moves from one stationary contact to the next upon the introduction of an electrical impulse to an actuating solenoid and is mechanically held in place until the arrival of the next impulse. The contacts may be used to self-operate the motor in a manner to be described, and the shaft may be used to transmit the interrupted rotary motion of the motor through a suitable gear train.

As best seen in Figure 4, a motor shaft 126 is connected to a worm shaft 130 suitably journalled in a support 134 affixed to base 78. Worm 132 meshes with a worm gear 136 affixed to shaft 138 preferably journalled in bearings 140 and 142 on walls 80 and 81 (Figures 2 and 3). A vertical indexing cam wheel 144 (Figure 4) and three switch cams 146, 148 and 150, all to be described, are keyed to shaft 138. As best seen in Figures 4 and 6, wheel 144 engages a cam follower 152 rotatably mounted on bracket 70. A suitable spring (not shown) is disposed to cam wheel 144 and follower 152 into engagement.

Referring to Figure 4, cam wheel 144 is shaped to rock scanning mirror 6 about a horizontal axis. The mirror starts in its extreme downward position. As cam 144 is rotated in a counter-clockwise direction (Figure 4) by motor 124, follower 152 tilts mirror 6 upwardly to its extreme upward position. The scanning operation is then completed, and the cam continues to rotate to bring follower 152 to the initial downward position for the next sequence.

Still referring to Figures 2, 3 and 4, switch cams 146, 148 and 150 (Figure 3) are arranged to engage the actuating levers of switches 158, 160 and 162, suitably mounted in a bank on a bracket 164 secured to base 78 (Figure 2). The switch cams are arranged to actuate their associated switches at various vertical orientations of mirror 6. Thus cam 146 may actuate switch 158 at the zero degree or home position of the scanning mirror, i.e., at the beginning of the scanning operation; cam 148 may be arranged to actuate switch 160 after the mirror has indexed upwardly 5°; and cam 150 may actuate switch 162 after a total indexing movement of 10°. These switches act to control the operation of the scanning mechanism.

Thus it is seen that during the scanning operation cam 96, rotated by motor 84, operates to oscillate the scanning mirror 6 about axis 14 to scan substantially horizontal lines in the field of view. As the end of each line is reached, an actuator pin 116 or 118 on cam 96 actuates switch 120 to transmit an electrical impulse to indexing motor 124. Upon energization motor 124 rotates shaft 126 and cam 144 a predetermined number of degrees to index mirror 6 upwardly so that the next scanned line will be adjacent and substantially parallel to the previous line. These oscillatory and indexing movements continue until the entire field of view has been scanned. It will be noted that cam 96 engages follower 106 substantially on the horizontal axis of rotation and thus has no effect on motion about this axis; similarly cam 144 engages bracket 70 on axis 14 (Figure 3) and thus will not effect motion thereabout.

In order to interpret properly the heat picture produced by our infra-red camera it is often desirable to calibrate the various gradations of gray so that one may readily determine the temperatures of the various objects reproduced therein. We have, accordingly, provided a self-calibrating system in which a series of squares of varying gradations of gray representing predetermined temperatures in the field of view are displayed across the top of the heat picture on plate 26.

On completion of the scanning of the field of view, detector 18 is inactivated and the gray scale generator 104 is connected into the electrical circuitry to modulate glow modulator tube 20. Scanning mirror 6 with reproducing mirror 22 attached thereto continues to oscillate and index, and the gray scale generator synchronized with the oscillating movement successively varies the intensity of the light beam emitted by tube 20; it is thus swept across photographic plate 26 by mirror 22.

Each horizontal line traced on plate 26 thus has a series of segments progressively varying in grayness from one end to the other. A series of adjacent lines of this type forms blocks of varying grayness corresponding to the given temperatures. More particularly, as best seen in Figures 2, 4 and 5, pinion 100 is preferably of the same diameter as pinion 94 and thus completes one rotation for every two lines scanned by mirrors 6 and 22. Shaft 102 driven by pinion 100 may be connected to the radial arm of a potentiometer or other suitable device capable of providing a step-wise varying output voltage. Generator 104 is so arranged that during the sweeping of one line on plate 26, corresponding to oscillation of mirror 22 in one direction, the output voltage therefrom increases, and during the sweeping of the succeeding line, corresponding to oscillation in the other direction, the voltage decreases symmetrically.

Thus as the light beam is swept across photographic plate 26 in one direction it will increase in intensity in a series of steps until mirror 22 indexes vertically and reverses horizontal direction, at which point the light beam will begin to decrease in intensity in a series of steps corresponding and equal to those in the first traced line. This operation continues until a suitable number of lines, say 8, have been recorded on plate 26, resulting in a horizontally arranged series of blocks of varying gradations of gray. The output voltage from generator 104 having been previously calibrated, these gray blocks correspond to varying temperatures in the field of view. The observer viewing the reproduction on plate 26 may therefore readily determine the temperature of the various objects depicted therein by comparison with the gradations on the gray scale.

Returning to Figure 1, a chopping disk 176 is interposed between parabolic mirror 8 and detector 18. Disk 176 preferably has alternate V-shaped cut-outs (not shown), so that upon rotation it will periodically intercept the radiation reflected by mirror 8 toward detector 18. The rear surfaces of the segments of disk 176 are fitted with mirrors 178, whose use will presently be described. Preferably a black body infra-red radiation source 180 in the form of a black surfaced cone at ambient temperature is positioned so that the radiation emitted therefrom is directed toward mirrors 178 and reflected by the mirrors toward detector 18 when they are opposite it. In operation chopping disk 176, which is rotated by chopper motor 172, acts as a switch, alternately passing the incoming signal from mirror 8 to detector 18 and then reflecting the radiation from radiation source 180 to the detector by mirrors 178. Consequently there appears at the output of detector 18 an alternating voltage whose amplitude is proportional to the difference between the intensity of the radiation from the point being scanned and the intensity of the radiation from source 180. The output of detector 18 is thus in the form of a carrier whose frequency is equal to the chopping frequency, with an envelope which corresponds to changes in the intensity of incoming infra-red radiation. This largely eliminates the effect of detector drift due to such factors as changes in supply voltage, etc. Moreover the output of detector 18 can thus be amplified by a conventional alternating current amplifier, eliminating the drift and instability problems encountered with direct current amplifiers.

Preferably chopper motor 172 drives a second chopping disk 182 similar to disk 176. Disk 182 periodically interrupts a beam of light passing from a light source 184 to a conventional photo cell 186 whose resulting alternating current output may thus be used to operate an electrical chopper.

In Figure 7 there is shown electrical circuitry associated with the detection and electrical reproduction of radiation coming from the field of view. Preferably a pair of batteries 188 and 190 supplying biasing voltages are serially connected in a bridge circuit including detector 18 and a second detector 192, which is shielded from all incoming infra-red radiation by a shield diagrammatically indicated at 194. Interconnected switches Sw1 and Sw2 may be provided to disconnect detectors 18 and 192 from batteries 188 and 190 when the camera is not in use. The output of the bridge is taken from junction 196 between the two detectors and junction 198 between the two batteries and applied to the input of a preamplifier 200. The output of preamplifier 200 is passed through a filter 202 and an attenuator generally indicated at 204 to an amplifier 206. The signal is then applied to a suitable demodulator 208 which translates it back to the frequency range found in the changes in intensity of the incoming radiation. The demodulated signal may be further filtered by a filter 210 to further remove unwanted frequency components before being fed to a glow tube driver in the form of an amplifier 212, the output of which modulates the glow modulator tube 20.

Preferably batteries 188 and 190 are adjusted to provide the same voltage, and detectors 18 and 192 are of the same type, having substantially identical characteristics, including internal resistance. Therefore, the biasing voltages across the detectors are equal and in the absence of an input signal the voltage between junctions 196 and 198 will be zero. Should there be a change in ambient temperature, the resistance of detector 18 will change and that of detector 192 will also change by the same amount, thereby leaving unchanged the output voltage of the bridge; and no signal resulting from such change will reach preamplifier 200. The bridge circuit compensates for aging of the detector 18 as well, for detector 192 suffers similar changes in characteristics from this phenomenon.

During the generation of the gray scale the input to detector 18 is desirably cut off by a conventional solenoid-operated shutter mechanism, generally indicated at 214. The output of gray scale generator 104 is then passed through normally open contacts *a* of a gray scale relay Ry1 and a synchronous chopper 216 to the input of preamplifier 200. It is then passed through the above described filtering, amplifying and demodulating system to modulate glow modulator tube 20 in the manner described. Chopper 216 is preferably operated by the output of a signal generator 218 controlled in any suitable manner by photocell 186 (see Figure 1); thus the frequency from chopper 216 is the same as that from chopping disk 176, and is therefore within pass band of filter 202. Attenuator 204 serves to calibrate the gray scale generator by providing the correct relation between the voltages during gray scale generation and during scanning. Thus the output of the attenuator may be taken from a fixed tap 220 through normally open contacts *b* of gray scale relay Ry1 during gray scale generation and from a properly set movable contact 222 through normally closed contacts Ry1*c* during the scanning of the field of view. The gray scale relay Ry1 may be operated by switch 160 or 162 after such scanning. Preferably normally open contacts "*a*" of an appropriately energized relay Ry2 are interposed between the glow tube driver 212 and the glow modulator tube 20, so that the tube will emit light only during scanning and gray scale generation. At all other times tube 20 is dark and the photographic plate or film 26 may be kept in the camera in readiness for picture taking.

In certain cases it may be desirable to display the image produced by our infra-red camera on a long persistence dark trace cathode ray tube instead of on a photographic film. As shown in Figure 7 we have provided the glow tube driver 212 with a second output connecting through a normally open contact *b* of relay Ry2 with the signal input of a dark trace cathode ray tube indicated at 224. The output of the glow tube driver thus operates to modulate the intensity of the electron beam in the tube, and conventional mechanism to horizontally sweep the electron beam across the face of the tube and index it vertically is provided to form thereon a thermal image of the scanned field. More particularly, a linear variable displacement transformer generally indicated at 226 (Figure 3) may be mounted on wall 81 and have a probe wire 228 connected to the scanning mirror mounting bracket 38. The electrical output of the transformer is indicative of the horizontal position of the scanning mirror 6, and may be applied to the horizontal deflection system of cathode ray tube 224 to synchronize it with the horizontal movements of mirror 6. To vertically index the electron beam there may be provided a second wiper-stationary-contact set in indexing motor 124, with the stationary contacts interconnected by a series of resistances to form a potentiometer. The output of this potentiometer may be applied to the vertical deflection system to properly index the beam.

Our camera as described above performs suitably in many applications. However an unacceptable distortion of the field of view may be encountered in certain situations. This distortion stems from the fact that the field of view scanned by the camera is not rectangular in form. More particularly, the height of a portion of the field varies depending on the azimuth angle thereof. Portions of the field of view which lie in a plane perpendicular to the horizontal axis of mirror 6 have maximum angular height, and those lying in a plane parallel to the axis, have zero height. Portions lying between these two extremes have intermediate heights, so that the entire field of view of the camera if the scanning mirror 6 were arranged to oscillate horizontally 180° would take the general shape of a lune as shown in Figure 9. This may best be understood by considering the movement of a normal to the mirror as the mirror is vertically rotated. Where the mirror is parallel to the horizontal axis of rotation, rotation of that axis through a given angle will cause the normal to move through the same angle. One the other hand, when the mirror is swung around to be perpendicular to the horizontal axis, rotation of the axis will cause no angular displacement of the normal. Intermediate the perpendicular and parallel positions of the mirror the angular movement of the normal for a given amount of rotation about the horizontal axis will vary, progressing from zero when the mirror faces one end of the axis to a maximum in the parallel position and then decreasing to zero when facing the other end of the axis. Since the height of a given portion of the field of view depends on the amount of variation in angular position of the normal when the portion is being "looked at," those portions "looked at" when the mirror is parallel to the horizontal axis of rotation will tend to have greater height than those "looked at" when the mirror moves into normality with the axis.

This analysis is modified by the fact that portions of the field lying on a normal to the scanning mirror 6 when being "looked at" will tend to have greater height than those lying off the end of the mirror. Thus the height of any portion of the field of view is given by the following equation:

$$h=2\theta \sin (i+\alpha) \text{ cosin} \qquad (1)$$

where, with reference to Figure 10, (1) $h$ is the angular height of the portion,
(2) $\theta$ is the amount of angular rotation of the horizontal axis,
(3) $i$ is the angle of incidence, i.e. the angle between the normal to the scanning mirror 6 and a line from the mirror to the point being "looked at,"
(4) $\alpha$ is the angle running clockwise from the horizontal axis of rotation 16 and a line extending from the scanning mirror to the detector (or to mirror 8 and perpendicular thereto), and
(5) $\theta$ is small, i.e. 10° or less.

An identical equation, $$h'=2\theta' \sin (i'+\alpha) \text{ cosin} \qquad (2)$$

determines the heights of portions of the image reproduced on plate 26, where:

(1) $h'$ is the angular height of the portion
(2) $\theta'$ is again the amount of rotation of the horizontal axis 16, i.e. $\theta=\theta'$
(3) $i'$ is the angle between the normal to the reproducing mirror 22 and a line from the mirror to the point being traced on plate 26, and
(4) $\alpha'$ is the angle running clockwise from the horizontal axis of rotation to a line extending from mirror 22 to the glow modulator tube 20.

Referring to Figure 9 we have in practice restricted the horizontal movement of the mirror to the limits indicated by the shaded area in the lune depicted therein. It will be seen that within these restricted limits the angular height of the field of view does not vary appreciably. However, as stated above, certain applications require extreme accuracy and therefore we have provided means for making the shape of the recorded image closely correspond to that of the field of view and thus produce a faithful reproduction thereof. In Figure 9 there is illustrated one solution of this problem in which the reproducing mirror 22 is mounted parallel to the scanning mirror 6. The glow modulator tube 20 and the photographic plate 26 are so arranged that the beam of light emitted toward mirror 22 is parallel to the rays of radiation from the point being "looked at" reflected by mirror 6; and the beam reflected from mirror 22 is parallel to the rays impinging on mirror 6. It is evident that $i'=i'$ $\alpha'=\alpha$, $\theta=\theta'$, $h'=h$ and the shape of the image must coincide with that of the field of view. It will be noted from Equations 1 and 2 that plate 26 in the display system corresponds to the field of view in the scanning system, and that therefore these two elements must be opposite each other (Figure 9). If the positions of plate 26 and glow tube 20 are reversed, the large and small ends of the reproduction will be reversed, thereby distorting the field of view.

The arrangement illustrated in Figure 9 requires a housing which may be larger than desirable, and therefore we have provided the arrangement shown in Figure 1 with the incident and reflected light beams of the display system folded toward each other thereby effecting a substantial saving in space. We have found that by disposing the various elements to obtain the following relationships, we provide a recorded image whose shape closely approximates that of the field of view:

$i=41°\pm5°$ (for 20° field width)
$\alpha=49°$
$i'=9°\pm5°$
$\alpha'=131°$

Optimum display system arrangements for other scanning system angles may be readily determined by first using Equation 1 to find the heights of the field of view at several azimuth angles and "matching" the reproduced image by varying $i'$ and $\alpha'$ until the corresponding azimuth angles in the image have the same respective heights, as determined by Equation 2. It will be noted that the adjustments of $i'$ and $\alpha'$ may be made physically in the camera, or by calculation from Equations 1 and 2, the latter method being preferred.

Thus we have described an infra-red camera which may be used to form infra-red images or "heat pictures" of objects. Our camera utilizes emitted rather than reflected radiation to form pictures and thus may be used to take pictures at night in the absence of illumination of the field of view by an infra-red source. It is of particular utility where it is desired to determine the temperature distribution in the field of view, as for example, in testing the insulation of a home determining the heat loss through a smoke stack and picturing the temperature distribution in an airplane engine.

Our camera, which may utilize a highly sensitive fast thermistor bolometer infra-red detector, scans the field of view point-by-point while a light beam traces a corresponding path on a photographic plate. By using a reciprocating mirror to scan the field of view with a second mirror attached thereto sweeping the beam of light over the photographic plate, we have provided an automatic fool-proof system for synchronizing the formation of the display with the scanning of the field of view. Moreover, this system is compatible for use by operators having a minimum of training.

Certain aspects of the structural and operating features of our camera may be used to detect an image of radiation other than infra-red and convert it into a second image in a medium other than visible light. Thus a camera of this type might in certain instances be used as an ultraviolet-to-visible light image transducer.

Also since the image recording element (e.g. photographic plate) may be sensitive to radiation other than visible light, the term "light" as used herein and in the claims includes all radiation which may be emitted from a suitable source, focused, reflected by a suitable reproducing mirror and recorded.

While we have described two preferred arrangements of our system for high accuracy reproduction of the field of view, it will be understood that other arrangements involving some of the basic novel concepts here disclosed may be suitable in many applications.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, may be said to fall therebetween.

We claim:

1. An infra-red camera comprising, in combination, an infra-red sensitive transducer, a plane scanning mirror positioned to reflect a portion of the infra-red energy incident thereon to said transducer, means adapted to rotate said scanning mirror about two non-parallel axes, whereby radiation from successive points in a field of view is reflected to said transducer, a reproducing mirror, means adapted to rotate said reproducing mirror in synchronism with the movements of said scanning mirror, a light source, means controlling the intensity of said light source in accordance with the signal produced by said transducer, a light sensitive surface, said light source, said reproducing mirror, and said surface being so positioned with respect to each other that light from said light source is reflected by said mirror to said surface and produces an image of said field of view thereon.

2. The combination defined in claim 1 including means for converging on said transducer infra-red radiation from the successive points in said field of view reflected by said scanning mirror.

3. An infra-red camera comprising, in combination, an infra-red sensitive transducer, a scanning mirror for reflecting infra-red radiation incident thereon to said transducer, converging means for converging on said transducer radiation from the field of view of said camera reflected by said scanning mirror and parallel to the optical axis of said converging means, means adapted to cause said scanning mirror to scan said field of view, whereby radiation from successive points in said field is converged on said transducer, a reproducing mirror, a variable intensity light source, means for varying the intensity of the light from said source in accordance with the signal produced by said transducer, said light source and said reproducing mirror being so positioned with respect to each other than light from said source is reflected by said mirror to a light sensitive surface, and means adapted to move said reproducing mirror in synchronism with said scanning mirror, whereby a beam of light from said light source is swept across said light sensitive surface in synchronism with the scanning of said field of view by said scanning mirror, thereby to generate a heat picture of said field on said medium.

4. The combination defined in claim 3 in which said reproducing mirror is affixed to said scanning mirror to move therewith and thereby provide automatic synchronism of the movements of said mirrors.

5. In apparatus for causing a detector to scan a field of view, the combination of a mirror disposed to intercept radiation from said field of view and reflect it to said detector, a bracket affixed to said mirror, a support, means rotatably connecting said support to said bracket for rotation of said mirror about a first axis, a base member, means rotatably connecting said support to said base member for rotation of said support and said mirror about a second axis substantially perpendicular to said first axis, a cam wheel, a cam follower wheel engaging said cam wheel, means connecting said cam follower wheel to said bracket, said cam wheel and said follower wheel being offset from said first axis, whereby upon rotation of said cam wheel said mirror reciprocates about said first axis, a second cam wheel, a second cam follower wheel in engagement with second cam wheel, said second follower wheel being connected to said support and offset from said second axis, whereby upon rotation of said second cam wheel said support and said mirror are made to reciprocate about said second axis, means adapted to continuously rotate said first cam wheel, whereby said mirror continuously rotates about said first axis to cause the detector to scan successive points along a line in said field of view, and means adapted to indexably rotate said second cam wheel after the scanning of a line to index said mirror about said second axis, whereby said detector may scan a second line substantially parallel to the first line.

6. In an image transducer for receiving and recording an image of radiation from a field of view, the combination of a scanning mirror, an electrical resistance device sensitive to said radiation, said scanning mirror being so positioned that radiation from said field of view impinging thereon is directed toward said resistance device, means adapted to rotate said scanning mirror about two axes thereby to scan said field of view, a reproducing mirror movable in synchronism with said scanning mirror, a light source, means directing light from said source to said reproducing mirror, means adapted to vary the intensity of said light according to the intensity of the signal developed by said resistance device, and a light sensitive surface disposed to intercept light emitted by said source and reflected from said reproducing mirror, whereby the light from said reproducing mirror is swept over said light sensitive surface in synchronism with the scanning of said field of view by said scanning mirror, thereby to generate an image of the radiation from said field of view.

7. The combination defined in claim 6 in which said reproducing mirror is affixed to said scanning mirror, thereby to provide automatic synchronization of the movements of said mirrors.

8. An infra-red camera comprising, in combination, an infra-red sensitive transducer, a plane scanning mirror for reflecting infra-red radiation incident thereon to said transducer, means for converging on said transducer radiation reflected by said scanning mirror and parallel to the optical axis of said converging means, means adapted to cause said scanning mirror to scan a field of view by reciprocating about a first axis and indexing about a second axis perpendicular to said first axis, said scanning means adapted to cause rotation of said first axis about said second axis, a reproducing mirror affixed to said scanning mirror at an angle of approximately 40° thereto, said angle lying in a plane parallel to said second axis and perpendicular to said first axis, a variable intensity light source, means adapted to vary the intensity of a light beam emitted from said source in accordance with the output of said transducer, a light sensitive surface, said light source and said surface being so disposed with respect to said reproducing mirror that a light beam emitted by said source will be reflected by said reproducing mirror on to said surface, whereby the movement of said reproducing mirror is synchronized with that of said scanning mirror and a heat picture of the field of view is generated on said medium, said light source, said surface, and said reproducing mirror being so arranged with respect to each other as to make the heat picture thereby generated on said surface substantially correspond to said field of view and the objects therein.

9. An infra-red camera comprising, in combination, a housing having an infra-red transparent window therein, a scanning mirror positioned to intercept a portion of the infra-red energy transmitted through said window, a thermally sensitive resistance device, means for converging on said resistance device infra-red energy from the field of view of said camera incident on said mirror and reflected thereby, scanning means adapted to reciprocate said scanning mirror about a first axis, whereby the radiation from said mirror converged on said resistance device is from successive points along a line in said field of view, means for indexing said mirror about a second axis at an angle to said first axis, whereby said camera may scan a plurality of substantially parallel lines, a reproducing mirror mounted to move in synchronism with said scanning mirror, a light source, means directing light from said source to said reproducing mirror, electrical means interconnecting said resistance device and said light source, whereby the intensity of the light from said source is controlled by a signal from said resistance device, and a light sensitive film disposed to intercept the intensity controlled light beam reflected by said reproducing mirror and swept across said film thereby, whereby said reflected light beam generates on said film a heat picture of the field of view scanned by said scanning mirror.

10. The combination defined in claim 9 in which said reproducing mirror is affixed to said scanning mirror at an angle of approximately 40 degrees thereto, said angle lying in a plane parallel to said second axis and perpendicular to said first axis.

11. The combination defined in claim 9 in which said light source, said light sensitive film, and said reproducing mirror are so disposed with respect to each other than the angle $\alpha'$ running from said second axis to a line extending from said reproducing mirror to said light source is about 131 degrees, and the angle $i'$ between the normal to said reproducing mirror and a line from said reproducing mirror to the point being traced on said light sensitive film is $9\pm5$ degrees for a field width of 20 degrees.

References Cited in the file of this patent

UNITED STATES PATENTS

| | | |
|---|---|---|
| 1,862,622 | Hoffman | June 14, 1932 |
| 2,491,192 | Martin et al. | Dec. 13, 1949 |
| 2,742,578 | Nicolson et al. | Apr. 17, 1956 |
| 2,761,072 | Wormser | Aug. 28, 1956 |

UNITED STATES PATENT OFFICE

Certificate of Correction

Patent No. 2,895,049 July 14, 1959

Robert W. Astheimer et al.

It is hereby certified that error appears in the printed specification of the above numbered patent requiring correction and that the said Letters Patent should read as shown below.

Column 1, line 43, for "he" read —the—; column 9, line 3, for "Figure 9" read —Figure 8—; line 8, for "One" read —On—; line 32, equation (1), after "cosin" insert —*i*—; line 47, equation (2), after "cosin" insert —*i'*—; line 61, for "Figure 9" read —Figure 8—; column 10, line 4, after "that" for "$i'=i'$" read —$i'=i$—; column 11, line 48, and column 14, line 6, for "than", each occurrence, read —that—.

Signed and sealed this 1st day of December 1959.

[SEAL]

Attest:

KARL H. AXLINE,
*Attesting Officer,*

ROBERT C. WATSON,
*Commissioner of Patents.*